United States Patent
Naarmann et al.

(10) Patent No.: US 6,197,872 B1
(45) Date of Patent: Mar. 6, 2001

(54) THIN WALL PANELS

(75) Inventors: Herbert Naarmann, Frankenthal; Graham Edmund McKee, Neustadt; Alfred Pirker, Speyer; Hans-Josef Sterzel, Dannstadt-Schauernheim; Franz Brandstetter, Neustadt; Bernd-Steffen von Bernstorff, Wachenheim; Bernhard Rosenau, Neustadt; Ulrich Endemann, Frankenthal; Burkhard Straube, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/230,348

(22) PCT Filed: Jul. 24, 1997

(86) PCT No.: PCT/EP97/04034

§ 371 Date: Nov. 29, 1999

§ 102(e) Date: Nov. 29, 1999

(87) PCT Pub. No.: WO98/04633

PCT Pub. Date: Feb. 5, 1998

(30) Foreign Application Priority Data

Jul. 25, 1996 (DE) .............................. 196 30 118

(51) Int. Cl.$^7$ ..................................... C08L 51/00
(52) U.S. Cl. ........................................... 524/504
(58) Field of Search ............................... 524/504

(56) References Cited

U.S. PATENT DOCUMENTS

| | | | | |
|---|---|---|---|---|
| 4,174,358 | * | 11/1979 | Epstein | 525/183 |
| 4,694,042 | * | 9/1987 | McKee | 525/66 |
| 4,945,124 | * | 7/1990 | Westeppe | 525/63 |
| 5,369,154 | * | 11/1994 | Laughner | 523/436 |
| 5,409,967 | * | 4/1995 | Carson | 523/201 |
| 5,451,624 | * | 9/1995 | Memon | 524/151 |
| 5,489,648 | * | 2/1996 | Okimura | 525/71 |

* cited by examiner

Primary Examiner—Paul R. Michl
(74) Attorney, Agent, or Firm—Keil & Weinkauf

(57) ABSTRACT

The use of a thermoplastic molding composition differing from ABS and comprising, based on a total of 100% by weight of amounts of components A and B, and, if desired, C and/or D, a: as component A, from 1 to 99% by weight, preferably from 15 to 60% by weight, in particular from 25 to 50% by weight, of a particulate emulsion polymer with a glass transition temperature of below 0° C. and with a median particle size of from 50 to 1000 nm, preferably from 50 to 500 nm b: as component B, from 1 to 99% by weight, preferably from 40 to 85% by weight, in particular from 50 to 75% by weight, of at least one amorphous or partly crystalline polymer, c: as component C, from 0 to 50% by weight of polycarbonates, and d: as component D, from 0 to 50% by weight of fibrous or particulate fillers or mixtures of these for producing sheet-like wall elements and fastening parts therefor.

6 Claims, No Drawings

THIN WALL PANELS

The invention relates to sheet-like wall elements and also fastening parts therefor. In particular the invention relates to sheet-like wall elements which have good dimensional stability together with low density and low weight, good chemicals resistance and high scratch resistance.

Various materials have hitherto been used for producing sheet-like wall elements, such as visual privacy partitions in the interior of buildings, for example changing cubicles in sports facilities and other installations. Use is made, for example, of timber products, such as plywood, particle board and other boards, and also, less frequently, of metal sheets. Polymeric materials, such as PVC (polyvinyl chloride), ABS (acrylonitrile-butadiene-styrene copolymer) and PP (polypropylene) are also used in place of naturally occurring materials.

It is an object of the present invention to provide sheet-like wall elements which can be produced in a single-step process without post-treatment and have good dimensional stability. A further object of the invention is to provide sheet-like wall elements which have low density and therefore low weight, but nevertheless are stable. A further object of the invention is to provide sheet-like wall elements which have good chemicals resistance and high scratch resistance. A further object of the present invention is to provide sheet-like wall elements which have properties superior to those of the wall elements used hitherto.

We have found that this object is achieved by using a thermoplastic molding composition differing from ABS and comprising, based on a total of 100% by weight of amounts of components A and B, and, if desired, C and/or D,

- a: as component A, from 1 to 99% by weight of a particulate emulsion polymer with a glass transition temperature of below 0° C. and with a median particle size of from 50 to 1000 nm,
- b: as component B, from 1 to 99% by weight of at least one amorphous or partly crystalline polymer,
- c: as component C, from 0 to 50% by weight of polycarbonates, and
- d: as component D, from 0 to 50% by weight of fibrous or particulate fillers or mixtures of these for producing sheet-like wall elements and fastening parts therefor.

The sheet-like wall elements described are scratch-resistant, stable and resistant to chemicals and have very good dimensional stability. They have low density and thus a low weight.

The thermoplastic molding compositions used according to the invention for producing the novel sheet-like wall elements are known per se. Molding compositions which can be used according to the invention are described, for example, in DE-A-12 60 135, DE-C-19 11 882, DE-A-28 26 925, DE-A-31 49 358, DE-A-32 27 555 and DE-A-40 11 162.

In one embodiment, the molding compositions differing from ABS and used according to the invention for producing the novel sheet-like wall elements comprise the components listed below: A and B, and, if desired, C and/or D, as defined further below. Based on amounts of components A and B, and if desired, C and/or D, which give 100% in total, they comprise

- a: as component A, from 1 to 99% by weight, preferably from 15 to 60% by weight, in particular from 25 to 50% by weight, of a particulate emulsion polymer with a glass transition temperature of below 0° C. and with a median particle size of from 50 to 1000 nm, preferably from 50 to 500 nm
- b: as component B, from 1 to 99% by weight, preferably from 40 to 85% by weight, in particular from 50 to 75% by weight, of at least one amorphous or partly crystalline polymer,
- c: as component C, from 0 to 50% by weight of polycarbonates, and
- as component D, from 0 to 50% by weight of fibrous or particulate fillers or mixtures of these.

The invention is described in more detail below.

The molding compositions used for producing the novel sheet-like wall elements are firstly described together with the components of which these compositions are composed.

COMPONENT A

Component A is a particulate emulsion polymer with a glass transition temperature of below 0° C. and with a median particle size of from 50 to 1000 nm.

Component A is preferably a graft copolymer made from

- a1: from 1 to 99% by weight, preferably from 55 to 80% by weight, in particular from 55 to 65% by weight, of a particulate graft base A1 with a glass transition temperature of below 0° C.,
- a2: from 1 to 99% by weight, preferably from 20 to 45% by weight, in particular from 35 to 45% by weight, of a graft A2 made from the monomers, based on A2,
- a21: as component A21, from 40 to 100% by weight, preferably from 65 to 85% by weight, of units of a vinylaromatic monomer, preferably of styrene, of a substituted styrene or of a (meth)acrylate or mixtures of these, in particular of styrene and/or of α-methylstyrene, and
- a22: as component A22, up to 60% by weight, preferably from 15 to 35% by weight, of units of an ethylenically unsaturated monomer, preferably of acrylonitrile or methacrylonitrile, in particular of acrylonitrile.

The graft A2 here is composed of at least one graft shell, and the overall graft copolymer A has a median particle size of from 50 to 1000 nm.

In one embodiment of the invention, component A1 is composed of the following monomers:

- a11: as component A11, from 80 to 99.99% by weight, preferably from 95 to 99.9% by weight, of a $C_1$–$C_8$-alkyl acrylate, preferably n-butyl acrylate and/or ethylhexyl acrylate, and
- a12: as component A12, from 0.01 to 20% by weight, preferably from 0.1 to 5.0% by weight, of at least one polyfunctional crosslinking monomer, preferably diallyl phthalate and/or DCPA.

In one embodiment of the invention the median particle size of component A is from 50 to 800 nm, preferably from 50 to 600 nm.

In another embodiment of the invention, the particle size distribution of component A is bimodal, where, based on the total weight of component A, from 60 to 90% by weight has a median particle size of from 50 to 200 nm and from 10 to 40% by weight has a median particle size of from 50 to 400 nm.

The median particle size and particle size distribution given are the sizes determined from the integral mass distribution. The median particle sizes according to the invention are in all cases the weight average of the particle sizes. The determination of these is based on the method of W. Scholtan and H. Lange, Kolloid-Z. and Z.-Polymere 250

(1972), pages 782–796, using an analytical ultracentrifuge. The ultracentrifuge measurement gives the integral mass distribution of the particle diameter of a specimen. From this it is possible to deduce what percentage by weight of the particles have a diameter identical to or smaller than a particular size. The median particle diameter, which is also termed the $d_{50}$ of the integral mass distribution, is defined here as the particle diameter at which 50% by weight of the particles have a diameter smaller than that corresponding to the $d_{50}$. Equally, 50% by weight of the particles then have a larger diameter than the $d_{50}$. To describe the breadth of the particle size distribution of the rubber particles, $d_{10}$ and $d_{90}$ values given by the integral mass distribution are utilized alongside the $d_{50}$ value (median particle diameter). The $d_{10}$ and $d_{90}$ of the integral mass distribution are defined similarly to the $d_{50}$ with the difference that they are based on, respectively, 10 and 90% by weight of the particles. The quotient $$\frac{d_{90} - d_{10}}{d_{50}} = Q$$

is a measure of the breadth of the particle size distribution. Emulsion polymers A which can be used according to the invention as component A preferably have Q less than 0.5, in particular less than 0.35.

The glass transition temperature of the emulsion polymer A, and also of the other components used according to the invention, is determined using DSC (differential scanning calorimetry) in accordance with ASTM 3418 (midpoint temperature).

The rubbers which can be used as emulsion polymer A are the usual relevant rubbers such as, in one embodiment of the invention, epichlorohydrin rubbers, ethylene-vinyl acetate rubbers, polyethylene chlorosulfone rubbers, silicone rubbers, polyether rubbers, hydrogenated diene rubbers, polyalkenamer rubbers, acrylate rubbers, ethylene-propylene rubbers, ethylene-propylene-diene rubbers, butyl rubbers and fluorine rubbers. Preference is given to acrylate rubber, ethylene-propylene (EP) rubber and ethylene-propylene-diene (EPDM) rubber, in particular acrylate rubber.

Pure butadiene rubbers, as used in ABS, may not be used as the sole component A.

In one embodiment, the fraction of the fundamental diene building block in the emulsion polymer A is held so low that very few unreacted double bonds remain in the polymer. In one embodiment there are no fundamental diene building blocks in the emulsion polymer A.

The acrylate rubbers are preferably alkyl acrylate rubbers made from one or more $C_1$–$C_8$-alkyl acrylates, preferably $C_4$–$C_8$-alkyl acrylates, where use is preferably made at least to some extent of butyl, hexyl, octyl or 2-ethylhexyl acrylate, in particular n-butyl and 2-ethylhexyl acrylate. These alkyl acrylate rubbers may comprise as comonomers up to 30% by weight of monomers which form hard polymers, for example vinyl acetate, (meth)acrylonitrile, styrene, substituted styrene, methyl methacrylate or vinyl ethers.

In one embodiment of the invention the acrylate rubbers further comprise from 0.01 to 20% by weight, preferably from 0.1 to 5% by weight, of polyfunctional monomers with crosslinking action (crosslinking monomers). Examples of these are monomers which contain 2 or more double bonds capable of copolymerization, preferably not conjugated in 1,3 positions.

Examples of suitable crosslinking monomers are divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate and allyl methacrylate. Dicyclopentadienyl acrylate (DCPA) has proven to be a particularly useful crosslinking monomer (cf DE-C 12 60 135).

Examples of suitable silicone rubbers are crosslinked silicone rubbers made from units of the general formulae $R_2SiO$, $RSiO_{3/2}$, $R_3SiO_{1/2}$ and $SiO_{2/4}$, where R is a monovalent radical. The amounts of the individual siloxane units here are judged in such a way that for each 100 units of the formula $R_2SiO$ there are from 0 to 10 molar units of the formula $RSiO_{3/2}$, from 0 to 1.5 molar units of $R_3SiO_{1/2}$ and from 0 to 3 molar units of $SiO_{2/4}$. R here can be either a monovalent saturated hydrocarbon radical having from 1 to 18 carbon atoms, phenyl or alkoxy or a group susceptible to free-radical attack, for example vinyl or mercaptopropyl. At least 80% of the radicals R are preferably methyl radicals. Combinations of methyl and ethyl or phenyl radicals are particularly preferred.

Preferred silicone rubbers incorporate units of groups susceptible to free-radical attack, in particular vinyl, allyl, halo or mercapto groups, preferably in amounts of from 2 to 10 mol % based on all of the radicals R. They may, for example, be prepared as described in EP-A-0 260 558.

It can be useful in some cases to use an emulsion polymer A made from uncrosslinked polymer. Monomers which can be used to prepare these polymers are all of the abovementioned monomers. Examples of preferred non-crosslinked emulsion polymers A are homo- and copolymers of acrylates, in particular of n-butyl and of ethylhexyl acrylate, and also homo- and copolymers of ethylene, of propylene, of butylene or of isobutylene, and also poly(organosiloxanes). In all cases these may be linear or else branched.

Core-shell emulsion polymer A

Emulsion polymer A can also be a polymer built up in more than one stage (have core-shell morphology). For example, an elastomeric core ($T_g<0°$ C.) may have been encapsulated by a hard shell (polymers with $T_g>0°$ C.) or vice versa.

In a particularly preferred embodiment of the invention, component A is a graft copolymer. The graft copolymers A of the molding compositions according to the invention here have a median particle size $d_{50}$ of from 50 to 1000 nm, preferably from 50 to 600 nm, and particularly preferably from 50 to 400 nm. These particle sizes may be achieved if particle sizes of from 50 to 350 nm, preferably from 50 to 300 nm and particularly preferably from 50 to 250 nm, are used as graft base A1 of this component A.

The graft copolymer A generally has one or more stages, i.e. is a polymer built up from a core and from one or more shells. The polymer is composed of a base (graft core) A1 and of one or preferably more than one stage A2 (graft) grafted onto this, known as the graft stages or graft shells.

One or more graft shells may be applied to the rubber particles via simple grafting or multiple stepwise grafting. Each graft shell may have a different formulation. In addition to the grafting monomers and together with these, polyfunctional crosslinking monomers or monomers containing reactive groups may be grafted on (see, for example, EP-A-0 230 282, DE-A-36 01 419 and EP-A-0 269 861).

In a preferred embodiment, component A is composed of a graft copolymer built up in more than one stage, where the grafts have generally been prepared from resin-forming monomers and have a glass transition temperature $T_g$ above 30° C., preferably above 50° C. The structure with more than one stage serves, inter alia, to achieve some degree of compatibility of the rubber particles A with the thermoplastic B.

Graft copolymers A are prepared, for example, by grafting at least one of the monomers A1 listed below onto at least one of the graft bases (or graft core materials) A1 listed above. Suitable graft bases A1 in the molding compositions according to the invention are any of the polymers which have been described above under the emulsion polymers A.

In one embodiment of the invention the graft base A1 has been formulated from from 15 to 99% by weight of acrylate rubber, from 0.1 to 5% by weight of crosslinking agent and from 0 to 49.9% by weight of one of the other monomers or rubbers stated.

Suitable monomers for forming the graft A2 may, for example, have been selected from the monomers listed below and mixtures of these:

Vinylaromatic monomers, such as styrene and its substituted derivatives such as α-methylstyrene, p-methylstyrene, 3,4-dimethylstyrene, p-tert-butylstyrene, o- and p-divinylbenzene and p-methyl-α-methylstyrene, and $C_1$–$C_8$-alkyl (meth)acrylates, such as methyl methacrylate, ethyl methacrylate, methyl acrylate, ethyl acrylate, n-butyl acrylate and sec-butyl acrylate. Preference is given to styrene, α-methylstyrene and methyl methacrylate, in particular styrene and/or α-methylstyrene, and ethylenically unsaturated monomers, such as acrylic and methacrylic compounds, for example acrylonitrile, methacrylonitrile, acrylic and methacrylic acid, methyl acrylate, ethyl acrylate, n-propyl and isopropyl acrylate, n-butyl and isobutyl acrylate, tert-butyl acrylate, 2-ethylhexyl acrylate, methyl methacrylate, ethyl methacrylate, n-propyl and isopropyl methacrylate, n-butyl and isobutyl methacrylate, tert-butyl methacrylate, cyclohexyl methacrylate, isobornyl methacrylate and maleic anhydride and its derivatives, such as maleic esters, maleic diesters and maleimides, e.g. alkyl- and arylmaleimides, for example methyl- and phenylmaleimide. Preference is given to acrylonitrile and methacrylonitrile, in particular acrylonitrile.

Other (co)monomers which may be used are styrene compounds, vinyl compounds, acrylic or methacrylic compounds (e.g. styrene, substituted if desired with $C_1$–$C_{12}$-alkyl radicals, with halogen or with halomethylene radicals; vinylnaphthalene, vinylcarbazole; vinyl ethers having $C_1$–$C_{12}$ ether radicals; vinylimidazole, 3-(4-)vinylpyridine, dimethylaminoethyl (meth)acrylate, p-dimethylaminostyrene, acrylonitrile, methacrylonitrile, acrylic acid, methacrylic acid, butyl acrylate, ethylhexyl acrylate and methyl methacrylate, and also fumaric acid, maleic acid or itaconic acid or their anhydrides, amides, nitriles or esters with alcohols containing from 1 to 22 carbon atoms, preferably from 1 to 10 carbon atoms).

In one embodiment of the invention component A encompasses from 50 to 90% by weight of the graft base A1 described above and from 10 to 50% by weight of the graft A2 described above, based on the total weight of component A.

In one embodiment of the invention crosslinked acrylate polymers with a glass transition temperature below 0° C. are used as graft base A1. The crosslinked acrylate polymers should preferably have a glass transition temperature below −20° C., in particular below −30° C.

In a preferred embodiment the graft A2 is composed of at least one graft shell and the outermost graft shell of these has a glass transition temperature above 30° C., where a polymer formed from the monomers of the graft A2 would have a glass transition temperature above 80° C.

With respect to measurement of the glass transition temperature and the median particle size, and also the values of Q, that which has been said for the emulsion polymers A is applicable to the graft copolymers A.

The graft copolymers A may also be prepared by grafting preformed polymers onto suitable graft homopolymers. Examples of this are the products from reaction of base-containing rubbers with copolymers containing maleic anhydride groups or containing acid groups.

Suitable preparation processes for graft copolymers A are emulsion, solution, bulk and suspension polymerization. The graft copolymers A are preferably prepared by free-radical emulsion polymerization, in particular in the presence of latices of component A1 at temperatures of from 20 to 90° C., using water-soluble or oil-soluble initiators, such as peroxodisulfate or benzoyl peroxide, or with the aid of redox initiators. Redox initiators are also suitable for polymerization at below 20° C.

Suitable emulsion polymerization processes are described in DE-A-28 26 925 and 31 49 358 and in DE-C-12 60 135.

The graft shells are preferably built up in an emulsion polymerization process, as described in DE-A-32 27 555, 31 49 357, 31 49 358 and 34 14 118. The specified setting of the particle sizes according to the invention of from 50 to 1000 nm preferably takes place by the processes described in DE-C-12 60 135 and DE-A-28 26 925, and Applied Polymer Science, Vol. 9 (1965), page 2929. The use of polymers with different particle sizes is known, for example, from DE-A-28 26 925 and U.S. Pat. No. 5,196,480.

According to the process described in DE-C-12 60 135, the graft base A1 is first prepared by polymerizing the acrylate(s) used in one embodiment of the invention and the polyfunctional monomer which brings about crosslinking, if desired together with the other comonomers, in aqueous emulsion in a manner known per se at temperatures of from 20 to 100° C., preferably from 50 to 80° C. The usual emulsifiers may be used, such as alkali metal salts of alkyl- or alkylarylsulfonic acids, alkyl sulfates, fatty alcohol sulfonates, salts of higher fatty acids having from 10 to 30 carbon atoms or resin soaps. Preference is given to the use of the sodium salts of alkylsulfonates or fatty acids having from 10 to 18 carbon atoms. In one embodiment the amounts of the emulsifiers used are from 0.5 to 5% by weight, in particular from 1 to 2% by weight, based on the monomers used in preparing the graft base A1. The weight ratio of water to monomers is generally from 2:1 to 0.7:1. The polymerization initiators used are in particular the common persulfates, such as potassium persulfate. However, redox systems may also be used. The initiators are generally used in amounts of from 0.1 to 1% by weight, based on the monomers used in preparing the graft base A1. Other polymerization auxiliaries which may be used in the polymerization are the usual buffer substances by means of which the pH can be set at preferably from 6 to 9, for example sodium bicarbonate and sodium pyrophosphate, and also from 0 to 3% by weight of a molecular weight regulator, such as mercaptans, terpinols or dimeric α-methylstyrene.

The precise polymerization conditions, in particular the type, method of addition and amount of the emulsifier, are individually determined within the ranges given above in such a way that the $d_{50}$ of the resultant latex of the crosslinked acrylate polymer is in the range from about 50 to 1000 nm, preferably from 50 to 150 nm, particularly preferably from 80 to 100 nm. The particle size distribution of the latex here should preferably be narrow. The quotient $$\frac{d_{90} - d_{10}}{d_{50}} = Q$$

should be <0.5, preferably <0.35.

In a subsequent step, polymerization of a monomer mixture made from styrene and acrylonitrile in the presence of the resultant latex of the crosslinked acrylate polymer in one embodiment of the invention is carried out to prepare the graft polymer A, where in one embodiment of the invention the weight ratio of styrene to acrylonitrile in the monomer mixture should be in the range from 100:0 to 40:60, and preferably from 65:35 to 85:15. This graft copolymerization of styrene and acrylonitrile onto the crosslinked polyacrylate polymer serving as a graft base is advantageously carried out in aqueous emulsion under the usual conditions described above. The graft copolymerization may usefully take place in the system used for the emulsion polymerization to prepare the graft base A1, where further emulsifier and initiator may be added if necessary. The mixture of styrene and acrylonitrile monomers which is to be grafted on in one embodiment of the invention may be added to the reaction mixture all at once, in portions in more than one step, or preferably continuously during the course of the polymerization. The graft copolymerization of the mixture of styrene and acrylonitrile in the presence of the crosslinking acrylate polymer is carried out in such a way as to obtain a degree of grafting of from 1 to 99% by weight, preferably from 20 to 45% by weight, in particular from 35 to 45% by weight, based on the total weight of component A. Since the grafting yield in the graft copolymerization is not 100% the amount of the mixture of styrene and acrylonitrile monomers which has to be used in the graft copolymerization is somewhat greater than that which corresponds to the desired degree of grafting. Control of the grafting yield in the graft copolymerization, and therefore of the degree of grafting of the finished graft copolymer A, is a topic with which the person skilled in the art is familiar. It may be achieved, for example, via the metering rate of the monomers or via addition of regulator (Chauvel, Daniel, ACS Polymer Preprints 15 (1974), pp. 329 ff). The emulsion graft copolymerization generally gives from about 5 to 15% by weight, based on the graft copolymer, of free, ungrafted styreneacrylonitrile copolymer. The proportion of the graft copolymer A in the polymerization product obtained in the graft copolymerization is determined by the method given above.

Preparation of the graft copolymers A by the emulsion process gives, besides the technical process advantages stated above, the possibility of reproducible changes in particle sizes, for example by agglomerating the particles at least to some extent to give larger particles. This implies that polymers with different particle sizes may also be present in the graft copolymers A.

In particular, component A made from graft base and graft shell(s) can be matched ideally to the respective application, and in particular with respect to particle size.

Graft copolymers A generally comprise from 1 to 99% by weight, preferably from 55 to 80% by weight and particularly preferably from 55 to 65% by weight, of graft base A1 and from 1 to 99% by weight, preferably from 20 to 45% by weight, particularly preferably from 35 to 45% by weight, of the graft A2, based in each case on the entire graft copolymer.

COMPONENT B

Component B is an amorphous or partly crystalline polymer.

Component B is preferably a copolymer made from
b1: as component B1, from 40 to 100% by weight, preferably from 60 to 70% by weight, of units of a vinylaromatic monomer, preferably of styrene or of a substituted styrene or of a (meth)acrylate or mixtures of these, in particular of styrene and/or of α-methylstyrene, and
b2: as component B2, up to 60% by weight, preferably from 30 to 40% by weight, of units of an ethylenically unsaturated monomer, preferably of acrylonitrile or of methacrylonitrile, in particular of acrylonitrile.

In a preferred embodiment of the invention, the viscosity number of component B is from 50 to 90, preferably from 60 to 80.

The amorphous or partly crystalline polymers of component B of the molding composition used according to the invention for producing the novel sheet-like wall elements are preferably at least one polymer selected from the class consisting of partly crystalline polyamides, partially aromatic copolyamides, polyolefins, ionomers, polyesters, polyether ketones, polyoxyalkylenes, polyarylene sulfides and polymers made from vinylaromatic monomers and/or ethylenically unsaturated monomers. It is also possible to use polymer mixtures.

Polyamides suitable as component B of the molding composition used according to the invention for producing the novel sheet-like wall elements are partly crystalline, preferably linear polyamides, such as nylon-6, nylon-6,6, nylon-4,6 and nylon-6,12, and partly crystalline copolyamides based on these components. It is also possible to use partly crystalline polyamides whose acid component is composed partly or entirely of adipic acid and/or terephthalic acid and/or isophthalic acid and/or suberic acid and/or sebacic acid and/or azelaic acid and/or dodecanedicarboxylic acid and/or of a cyclohexanedicarboxylic acid, and whose diamine component is composed in particular partly or entirely of m- and/or p-xylylenediamine and/or hexamethylenediamine and/or 2,2,4- and/or 2,4,4-trimethylhexamethylenediamine and/or isophoronediamine, and whose formulations in principle are known from the prior art (cf Encyclopedia of Polymers, Vol. 11, pp. 315 ff).

Examples of other polymers suitable as component B of the molding compositions used according to the invention for producing the novel sheet-like wall elements are partly crystalline polyolefins, preferably homo- and copolymers of olefins such as ethylene, propylene, 1-butene, 1-pentene, 1-hexene, 1-heptene, 3-methyl-1-butene, 4-methyl-1-butene, 4-methyl-1pentene and 1-octene. Suitable polyolefins are polyethylene, polypropylene, poly-1-butene and poly-4-methyl-1-pentene. Under polyethylene (PE) a distinction is made in general between high-density PE (HDPE), low-density PE (LDPE) and linear low-density PE (LLDPE).

In another embodiment of the invention ionomers are component B. These are generally polyolefins as described above, in particular polyethylene, which comprise cocondensed monomers with acid groups, e.g. acrylic acid, methacrylic acid and, if desired, other copolymerizable monomers. The acid groups are generally converted with the aid of metal ions, such as $Na^+$, $Ca^{2+}$, $Mg^{2+}$ and $Al^{3+}$ into ionic, if desired ionically crosslinked, polyolefins which, however, can still be processed thermoplastically (see, for example, U.S. Pat. Nos. 3,264,272; 3,404,134; 3,355,319 and 4,321,337). However, the conversion of the polyolefins containing acid groups by the use of metal ions is not essential. Polyolefins containing free acid groups are also suitable as component B according to the invention. These then generally have rubbery character and to some extent comprise yet other copolymerizable monomers, e.g. (meth)acrylates.

Besides these, polyesters, preferably aromatic/aliphatic polyesters, may also be used as component B. Examples of these are polyalkylene terephthalates, e.g. based on ethylene glycol, 1,3-propanediol, 1,4-butanediol, 1,6-hexanediol and 1,4-bis(hydroxymethyl)cyclohexane, and also polyalkylene naphthalates.

Polyether ketones, for example as described in the publications GB 1 078 234, U.S. Pat. No. 4,010,147, EP-A-0 135 938, EP-A-0 292 211, EP-A-0 275 035, EP-A-0 270 998 and EP-A-0 165 406, and in the publication by C. K. Sham et al., Polymer 29/6, (1988), 1016–1020, may also be used as component B.

Polyoxyalkylenes, e.g. polyoxymethylene, and oxymethylene polymers may also be used as component B of the molding compositions used according to the invention for producing the novel sheet-like wall elements.

Other polymers suitable as component B are polyarylene sulfides, in particular polyphenylene sulfide.

In one embodiment of the invention, the component is built up from from 50 to 99% by weight of vinylaromatic monomers and from from 1 to 50% by weight of at least one of the other monomers given.

Component B is preferably an amorphous polymer, as described above in the form of graft A2. In one embodiment of the invention, component B is a copolymer of styrene and/or α-methylstyrene with acrylonitrile. The acrylonitrile content in these copolymers of component B is from 0 to 60% by weight, preferably from 30 to 40% by weight, based on the total weight of component B. The free, non-grafted styrene-acrylonitrile copolymers produced during the graft copolymerization to prepare component A also count as part of component B. Depending on the conditions selected for the graft copolymerization to prepare the graft copolymer A, a sufficient proportion of component B may already have been formed during the graft copolymerization. However, it will generally be necessary for the products obtained in the graft copolymerization to be blended with additional component B prepared separately.

This additional, separately prepared component B is preferably a styrene-acrylonitrile copolymer, an α-methylstyrene-acrylonitrile copolymer or a α-methylstyrene-styrene-acrylonitrile terpolymer. These copolymers may be used for component B either as individual polymers or else as a mixture, and therefore the additional, separately prepared component B of the molding compositions used according to the invention may be, for example, a mixture of a styrene-acrylonitrile copolymer with an α-methylstyrene-acrylonitrile copolymer. In the event that component B of the molding compositions used according to the invention is composed of a mixture of a styrene-acrylonitrile copolymer with an α-methylstyrene-acrylonitrile copolymer, the acrylonitrile contents of the two copolymers should preferably differ from one another by not more than 10% by weight, preferably not more than 5% by weight, based on the total weight of the copolymer. Component B of the molding compositions used according to the invention may, however, also be composed solely of a single styrene-acrylonitrile copolymer if the starting materials for the graft copolymerizations to prepare component A and for the preparation of the additional, separately prepared component B are the same monomer mixture of styrene and acrylonitrile.

The additional, separately prepared component B may be obtained by the conventional processes. In one embodiment of the invention, therefore, the copolymerization of the styrene and/or of α-methylstyrene with the acrylonitrile may be carried out in bulk, solution, suspension or aqueous emulsion. Component B preferably has a viscosity number of from 40 to 100, preferably from 50 to 90, in particular from 60 to 80. The viscosity number is determined here in accordance with DIN 53 726, dissolving 0.5 g of material in 100 ml of dimethylformamide.

Components A and B, and, if desired, C and D, may be mixed in any desired manner using any of the known methods. If, for example, components A and B have been prepared by emulsion polymerization, the polymer dispersions obtained may be mixed with one another, the polymers then precipitated together and the polymer mixture worked up. However, the blending of components A and B preferably takes place by extruding, kneading or rolling the components together. If required, the components have previously been isolated from the aqueous dispersion or solution obtained in the polymerization. The products of the graft copolymerization (component A) which have been obtained in aqueous dispersion may also be only partly dewatered and mixed in the form of moist crumbs with component B. In this case the complete drying of the graft copolymers takes place during the mixing.

In a preferred embodiment, the molding compositions used according to the invention for producing the novel sheet-like wall elements comprise, besides components A and B, additional components C and/or D, and also, if desired, other additives, as described below.

COMPONENT C

Suitable polycarbonates C are known per se. They preferably have a molar mass (weight average $M_w$, determined using gel permeation chromatography in tetrahydrofuran against polystyrene standards) in the range from 10,000 to 60,000 g/mol. They are obtainable, for example, by the processes of DE-B-1 300 266 by interfacial polycondensation or by the process of DE-A-1 495 730 by reacting diphenyl carbonate with bisphenols. A preferred bisphenol is 2,2-di(4-hydroxyphenyl)propane, referred to generally, and also below, as bisphenol A.

Instead of bisphenol A use may also be made of other aromatic dihydroxy compounds, in particular 2,2-di(4-hydroxyphenyl)pentane, 2,6-dihydroxynaphthalene, 4,4'-dihydroxy-diphenyl sulfone, 4,4'-dihydroxydiphenyl ether, 4,4'-dihydroxydiphenyl sulfite, 4,4'-dihydroxydiphenylmethane, 1,1-di(4-hydroxyphenyl) ethane, 4,4-dihydroxydiphenyl or dihydroxydiphenylcycloalkanes, preferably dihydroxydiphenyl-cyclohexanes or dihydroxydiphenylcyclopentanes, in particular 1,1 -bis(4-hydroxyphenyl)-3,3,5-trimethylcyclohexane, or also mixtures of the abovementioned dihydroxy compounds.

Particularly preferred polycarbonates are those based on bisphenol A or bisphenol A together with up to 80 mol % of the abovementioned aromatic dihydroxy compounds.

It is also possible to use copolycarbonates according to U.S. Pat. No. 3,737,409. Copolycarbonates based on bisphenol A and di(3,5-dimethyldihydroxyphenyl) sulfone are of particular interest here and have high heat resistance. It is also possible to use mixtures of different polycarbonates.

According to the invention, the average molar masses (weight average Mw determined with the aid of gel permeation chromatography in tetrahydrofuran against polystyrene standards) of the polycarbonates C are in the range from 10,000 to 64,000 g/mol. They are preferably in the range from 15,000 to 63,000 g/mol, in particular from 15,000 to 60,000 g/mol. This implies that the polycarbonates C have relative solution viscosities, measured in 0.5% strength by weight solution in dichloromethane at 25° C., in the range from 1.1 to 1.3, preferably from 1.15 to 1.33. The relative solution viscosities of the polycarbonates used preferably do not differ by more than 0.05, in particular not more than 0.04.

The polycarbonates C may be used either as ground material or as pellets.

They are present as component C in amounts of from 0 to 50% by weight, preferably from 10 to 40% by weight, based in each case on the entire molding composition.

In one embodiment of the invention, the addition of polycarbonates leads, inter alia, to higher thermal stability and improved cracking resistance of the molding compositions used according to the invention for producing the novel sheet-like wall elements.

COMPONENT D

The preferred thermoplastic molding compositions used according to the invention for producing the novel sheet-like wall elements comprise, as component D, from 0 to 50% by weight, preferably from 0 to 40% by weight, in particular from 0 to 30% by weight, of fibrous or particulate fillers or mixtures of these, based in each case on the entire molding composition.

These are preferably commercially available products. Reinforcing agents, such a carbon fibers and glass fibers, are usually used in amounts of from 5 to 50% by weight, based on the entire molding composition.

The glass fibers used may be made from E, A or C glass and have preferably been provided with a size and with a coupling agent. The diameter is generally from 6 to 20 $\mu$m. Use may be made either of continuous fibers (rovings) or of chopped glass fibers (staple) with a length of from 1 to 10 $\mu$m, preferably from 3 to 6 $\mu$m.

It is also possible to use fillers or reinforcing substances such as glass beads, mineral fibers, whiskers, alumina fibers, mica, powdered quartz and wollastonite.

In addition, metal flakes (e.g. aluminum flakes from Transmet Corp.), metal powders, metal fibers, metal-coated fillers, e.g. nickel-coated glass fibers, and also other additives which screen electromagnetic waves, may be admixed with the molding compositions used according to the invention for producing the novel sheet-like wall elements. Aluminum flakes (K 102 from Transmet) are particularly suitable for EMI (electromagnetic interference) purposes. The compositions may also be mixed with additional carbon fibers, carbon black, in particular conductivity black, or nickel-coated carbon fibers.

The molding compositions used according to the invention for producing the novel sheet-like wall elements may also comprise other additives typical of and commonly used for polycarbonates or for SAN polymers or for graft copolymers or for mixtures of these. Examples of additives of this type are: dyes, pigments, colorants, antistats, antioxidants, stabilizers for improving thermal stability, for increasing photostability and for raising hydrolysis resistance and chemicals resistance, agents to counteract thermal decomposition, and in particular the lubricants which are useful for producing moldings. These other additives may be metered in at any stage of the production process, but preferably at an early juncture in order to make early use of the stabilizing effects (or other specific effects) of the additive. Heat stabilizers or oxidation inhibitors are usually metal halides (chlorides, bromides or iodides) derived from metals of group 1 of the Periodic Table of the Elements, for example Li, Na, K or Cu.

Suitable stabilizers are the usual hindered phenols, or else vitamin E and/or compounds of similar structure. HALS stabilizers (hindered amine light stabilizers), benzophenones, resorcinols, salicylates, benzotriazoles and other compounds are also suitable (for example Irganox®, Tinuvin®, such as Tinuvine® 770 (HALS absorber, bis(2, 2,6,6-tetramethyl-4-piperidyl) sebacate) or Tinuvin®P (UV absorber (2H-benzotriazol-2-yl)-4-methylphenol), Topanol®). These are usually used in amounts of up to 2% by weight (based on the entire mixture).

Suitable lubricants and mold-release agents are stearic acids, stearyl alcohol, stearates and/or higher fatty acids in general, derivatives of these and corresponding fatty acid mixtures having from 12 to 30 carbon atoms. The amounts of these additions are in the range from 0.05 to 1% by weight.

Other possible additives are silicone oils, oligomeric isobutylene or similar substances, usually in amounts of from 0.05 to 5% by weight. It is also possible to use pigments, dyes and color brighteners, such as ultramarine blue, phthalocyanines, titanium dioxide, cadmium sulfides and derivatives of perylenetetracarboxylic acid.

Processing aids and stabilizers, such as UV stabilizers, lubricants and antistats, are usually used in amounts of from 0.01 to 5% by weight, based on the entire molding composition.

The thermoplastic molding compositions used according to the invention for producing the novel sheet-like wall elements may be prepared by processes known per se, by mixing the components. It can be advantageous to premix individual components. It is also possible to mix the components in solution and to remove the solvent.

Suitable organic solvents are, for example, chlorobenzene, mixtures of chlorobenzene and methylene chloride or mixtures of chlorobenzene or of aromatic hydrocarbons, e.g. toluene.

The removal of solvent from the solvent mixtures may take place, for example, in vented extruders.

The mixing of the, for example, dry components may take place by any of the known methods. However, the mixing is preferably carried out by rolling, kneading or extruding the components together, preferably at temperatures of from 180 to 400° C. If necessary, the components may previously have been isolated from the solution obtained during the polymerization, or from the aqueous dispersion.

The components here may be metered in either together or separately/in succession.

In one embodiment of the invention, the novel sheet-like wall elements and fastening parts for these may be produced by the known thermoplastic processing methods from the thermoplastic molding compositions used according to the invention. In particular, they may be produced by thermoforming, extrusion, injection molding, calendering, blow molding, compression molding, pressure sintering or sintering, preferably by extrusion blow molding.

In one embodiment of the invention the sheet-like wall elements, and also the fastening parts therefor, have a macroscopic filling material, preferably made from foamed polymer, at least part of the surfaces of which has been covered with a thermoplastic molding composition according to the invention. A sandwich structure is also possible, in which a macroscopic filling material, preferably made from foamed polymer, is located between 2 layers of thermoplastic molding compositions. Both surface coatings are formed from the thermoplastic molding composition.

The novel sheet-like wall elements which can be produced from the thermoplastic molding compositions described are scratch-resistant, stable and chemicals-resistant, and have very good dimensional stability. They also have low density and therefore low weight.

The novel wall elements may be used either in the outdoor sector (outside buildings) or in the indoor sector (within buildings). In one embodiment of the invention they may be used as visual privacy partitions or room dividers, colored if desired using pigments or dyes. They may also be used for external walls of mobile or fixed built structures.

Since the sheet-like wall elements are resistant to moisture and chemicals and also have very good dimensional stability on exposure to moisture and chemicals, they are particularly suitable for use in environments where they are exposed to moisture and/or to chemicals.

In one embodiment of the invention, therefore, the novel wall elements are preferably used in the washroom sector, in swimming pool and swimming bath installations, steam room installations, and sauna installations. In particular, sheet-like wall elements made from molding compositions which comprise polycarbonates as component C are very heat-resistant and capable of resisting prolonged periods of heat. The addition of the polycarbonate as component C here further improves the heat resistance and impact strength of the sheet-like wall elements. These sheet-like wall elements also have a balanced ratio of toughness to stiffness and good dimensional stability, and also excellent ability to resist heat aging, and high yellowing resistance under thermal stress and on exposure to UV radiation.

This use of the sheet-like wall elements is another embodiment of the invention.

Sheet-like wall elements made from molding compositions which comprise components A and B have excellent surface finishes, which are obtained without further surface treatment. The appearance of the finished surfaces of the sheet-like wall elements can be modified by appropriate modification of the morphology of the rubber, for example to achieve lustrous or matt surface finishes. When exposed to weathering and UV radiation, the sheet-like wall elements show very little graying and/or yellowing, and the surface properties are therefore retained. Other advantageous properties of the sheet-like wall elements are their high weathering resistance, good heat resistance, high yellowing resistance when exposed to UV radiation and thermal stress, good stress-cracking resistance, especially when exposed to chemicals, and good antielectrostatic performance. They also have a high level of colorfastness, for example partly as a consequence of their excellent resistance to yellowing and embrittlement. The novel sheet-like wall elements made from the thermoplastic molding compositions used according to the invention show no significant loss of toughness or impact strength, either at low temperatures or after prolonged exposure to heat; these properties are retained even after exposure to UV radiation. Tensile strength is also retained. In addition, they have a balanced ratio of stiffness to toughness.

According to the present invention, it is possible to reuse already used thermoplastic molding compositions for producing the novel sheet-like wall elements. The high level of colorfastness, weathering resistance and aging resistance of the molding compositions used according to the invention gives them very good suitability for recycling. The proportion of recycled molding composition here can be high. For example, use of 30% by weight of previously-used molding composition, admixed in ground form with the molding compositions used according to the invention, does not significantly change the relevant material properties, such as flowability, Vicat softening point and impact strength, of the molding compositions and of the novel sheet-like wall elements produced therefrom. Similar results were achieved in studies of weathering resistance. The impact strength was also constant over a long period when reused thermoplastic molding compositions were used, see Lindenschmidt, Ruppmich, Hoven-Nievelstein, International Body Engineering Conference, Sep. 21–23, 1993, Detroit, Mich., USA, Interior and Exterior Systems, pages 61–64. Resistance to yellowing was also retained.

The invention is described in more detail using the examples below.

EXAMPLES

Example 1

Preparation of fine-particle graft copolymer (A)

(a1) 16 parts of butyl acrylate and 0.4 part of tricyclodecenyl acrylate were heated to 60° C. with stirring in 150 parts of water with addition of 1 part of the sodium salt of a $C_{12}$–$C_{18}$ paraffin sulfonic acid, 0.3 part of potassium persulfate, 0.3 part of sodium hydrogencarbonate and 0.15 part of sodium pyrophosphate. 10 minutes after the polymerization reaction had begun, a mixture of 82 parts of butyl acrylate and 1.6 parts of tricyclodecenyl acrylate was added within a period of 3 hours. After monomer addition had ended, the reaction was allowed to continue for a further hour. The resultant latex of the crosslinked butyl acrylate polymer had a solids content of 40% by weight. The median particle size (weight average) was determined as 76 nm. The particle size distribution was narrow (quotient Q=0.29).

(a2) 150 parts of the polybutyl acrylate latex obtained in (a1) were mixed with 40 parts of a mixture of styrene and acrylonitrile (weight ratio 75:25) and 60 parts of water, and heated to 65° C. for 4 hours with stirring after adding a further 0.03 part of potassium persulfate and 0.05 part of lauroyl peroxide. After the graft copolymerization had ended, the polymerization product was precipitated from the dispersion at 95° C. using calcium chloride solution washed with water and dried in a stream of warm air. The degree of grafting of the graft copolymer was 35%.

Example 2

Preparation of coarse-particle graft copolymer (A)

(a1) 50 parts of water and 0.1 part of potassium persulfate were added to 2.5 parts of the latex prepared in step (a1) in Example 1. A mixture of 49 parts of butyl acrylate and 1 part of tricyclodecenyl acrylate and, secondly, a solution of 0.5 part of the sodium salt of a $C_{12}$–$C_{18}$ paraffinsulfonic acid in 25 parts of water were run in at 60° C. After the feed had ended, polymerization was continued for 2 hours. The resultant latex of the crosslinked butyl acrylate polymer had a solids content of 40%. The median particle size (weight average of the latex) was determined as 288 nm. The particle size distribution was narrow (Q=0.1)

(a2) 150 parts of this latex were mixed with 40 parts of a mixture of styrene and acrylonitrile (ratio 75:25) and with 110 parts of water, and heated at 65° C. for 4 hours with stirring after addition of a further 0.03 part of potassium persulfate and 0.05 part of lauroyl peroxide. The polymerization product obtained in the graft copolymerization was then precipitated from the dispersion at 95° C. using calcium chloride solution, washed with water and dried in a stream of warm air. The degree of grafting of the graft copolymer was determined as 27%.

Example 3
Preparation of coarse-particle graft copolymer (A)

(a1) 16 parts of butyl acrylate and 0.4 parts of tricyclodecenyl acrylate were added to 150 parts of water and 0.5 part of the sodium salt of a $C_{12}$–$C_{18}$ paraffinsulfonic acid, 0.3 part of potassium persulfate, 0.3 part of sodium hydrogencarbonate and 0.15 part of sodium pyrophosphate were run in and the mixture was heated to 60° C. with stirring. 10 minutes after the polymerization reaction had begun, a mixture of 82 parts of butyl acrylate and 1.6 parts of tricyclodecenyl acrylate was added within a period of 3 hours. After the monomer addition had ended, the reaction was allowed to continue for a further hour. The resultant latex of the crosslinked butyl acrylate polymer had a solids content of 40% by weight. The median particle size (weight average) was determined as 216 nm. The particle size distribution was narrow (Q=0.29).

(a2) 150 parts of the polybutyl acrylate latex obtained in (a1) were mixed with 20 parts of styrene and 60 parts of water and heated at 65° C. for 3 hours with stirring after addition of a further 0.03 part of potassium persulfate and 0.05 part of lauroyl peroxide. After the first step of the graft copolymerization had ended the graft copolymer had a degree of grafting of 17%. This graft copolymer dispersion, without further additives, was polymerized with 20 parts of a mixture of styrene and acrylonitrile (ratio 75:25) for a further 3 hours. After the graft copolymerization had ended, the product was precipitated from the dispersion using calcium chloride solution at 95° C., washed with water and dried in a stream of warm air. The degree of grafting of the graft copolymer was 35% and the median particle size of the latex particles was determined as 238 nm.

Example 4
Preparation of coarse-particle graft copolymer (A)

(a1) 50 parts of water and 0.1 part of potassium persulfate were added to 2.5 parts of the latex prepared in Example 3 (component A). A mixture of 49 parts of butyl acrylate and 1 part of tricyclodecenyl acrylate and, secondly, a solution of 0.5 parts of the sodium salt of a $C_{12}$–$C_{18}$ paraffinsulfonic acid in 25 parts of water were run in at 60° C. After the feed had ended, polymerization was continued for 2 hours. The resultant latex of the crosslinked butyl acrylate polymer had a solids content of 40%. The median particle size (weight average) of the latex was determined as 410 nm. The particle size distribution was narrow (Q=0.1)

(a2) 150 parts of the polybutyl acrylate latex obtained in (a1) were mixed with 20 parts of styrene and 60 parts of water and heated at 65° C. for 3 hours with stirring after addition of a further 0.03 part of potassium persulfate and 0.05 part of lauroyl peroxide. The dispersion obtained in this graft copolymerization was then polymerized with 20 parts of a mixture of styrene and acrylonitrile in a ratio of 75:25 for a further 4 hours. The reaction product was then precipitated from the dispersion using a calcium chloride solution at 95° C., separated off, washed with water and dried in a stream of warm air. The degree of grafting of the graft copolymer was determined as 35% and the median particle size of the latex particles was 490 nm.

Example 5
Preparation of coarse-particle graft copolymer (A)

(a1) 98 parts of butyl acrylate and 2 parts of tricyclodecenyl acrylate were polymerized at 65° C. for 3 hours with stirring in 154 parts of water with addition of 2 parts of sodium dioctyl sulfosuccinate (70% strength) as emulsifier and 0.5 part of potassium persulfate. This gave an approximately 40% strength dispersion. The median particle size of the latex was about 100 nm.

2.5 parts of this latex were mixed with 400 parts of water and 0.5 part of potassium persulfate, and a mixture of 49 parts of butyl acrylate, 1 part of tricyclodecenyl acrylate and 0.38 part of the emulsifier was added at 65° C. within a period of 1 hour. During the course of a further hour a mixture of 49 parts of butyl acrylate, 1 part of tricyclodecenyl acrylate and 0.76 part of emulsifier was added. After addition of 1 part of potassium persulfate in 40 parts of water, a mixture 196 parts of butyl acrylate, 4 parts of tricyclodecenyl acrylate and 1.52 parts of the emulsifier was finally added dropwise within a period of 2 hours. The polymerization of the polymer mixture was then continued for a further 2 hours at 65° C. This gave an approximately 40% strength dispersion with an average particle diameter of about 500 nm.

If, instead of 300 parts of monomers, only 100 parts were added, the latex obtained then had an average particle diameter of about 300 nm.

(a2) 465 parts of styrene and 200 parts of acrylonitrile were polymerized at 60° C., with stirring, in the presence of 2500 parts of the polymer latex of (a1) with the median particle size of, respectively, 0.1, 0.3 and 0.5 μm, 2 parts of potassium sulfate, 1.33 parts of lauroyl peroxide and 1005 parts of water. This gave a 40% strength dispersion from which the solid product was precipitated by addition of a 0.5% strength solution of calcium chloride, washed with water and dried.

Example 6
Preparation of copolymer (B)

A monomer mixture of styrene and acrylonitrile was polymerized under conventional conditions in solution. The resultant styrene-acrylonitrile copolymer had an acrylonitrile content of 35% by weight, based on the copolymer, and a viscosity number of 80 ml/g.

Example 7
Preparation of copolymer (B)

A monomer mixture of styrene and acrylonitrile was polymerized under conventional conditions in solution. The resultant styrene-acrylonitrile copolymer had an acrylonitrile content of 35% by weight, based on the copolymer, and a viscosity number of 60 ml/g.

Example 8
Preparation of copolymer (B)

A monomer mixture of styrene and acrylonitrile was polymerized under conventional conditions in solution. The resultant styrene-acrylonitrile copolymer had an acrylonitrile content of 27% by weight, based on the copolymer, and a viscosity number of 80 ml/g.

Comparative Example 1
ABS polymer

The comparative polymer used was a polybutadiene rubber which had been grafted with a styrene-acrylonitrile copolymer as component (A), in a styrene-acrylonitrile copolymer matrix as component (B). The content of graft rubber was 29% by weight, based on the total weight of the finished polymer.

Comparative Example 2

PVC Polymer

Another molding composition used for comparative purposes was a vinyl chloride polymer polymerized in suspension and having a K value of 61. The K value here was determined as described in DIN 53 726.

Example 9

As given in Table 1 below, the stated amounts of the appropriate polymers (A) and (B) and, respectively, of the comparative compositions, are mixed in a screw extruder at from 200 to 230° C. The molding compositions formed were used to produce sheet-like wall elements of size 80×100 cm and thickness from 0.1 to 0.5 cm, by sheet extrusion in a first step and sheet extrusion and thermoforming in a second step. The density of the molding compositions was determined by the method described in DIN 53 479.

TABLE 1

| Molding composition | Component from Example | Proportion % by weight | Density g/cm³ |
|---|---|---|---|
| I | A:1 | 42 | 1.07 |
|   | B:6 | 58 |   |
| II | A:2 | 45 | 1.07 |
|   | B:6 | 55 |   |
| III | A:3 | 47 | 1.07 |
|   | B:6 | 53 |   |
| IV | A:1 | 25 |   |
|   | A:3 | 10 | 1.07 |
|   | B:6 | 10 |   |
|   | B:7 | 55 |   |
| V | A:1 | 42 | 1.07 |
|   | B:8 | 58 |   |
| Comparison I | ABS | — | 1.05 |
| ComparisonII | PVC | — | 1.38 |

For components A from Examples 4 and 5, the densities measured were the same as in molding compositions III and IV for component A from Example 3.

To test the resistance of the moldings to disinfectants and chemicals, injection-molded test specimens of dimensions 2×15×80 mm were produced under the conditions given in DIN 16777, and based on the method of ISO 4599 the specimens were dipped into the appropriate chemical and subjected to a constant deformation for 24 hours. For comparative purposes, test specimens were held under the flexion in air. The bending radii used varied from infinite to 50 mm. Following the constant deformation, flexural impact tests were carried out on the test specimens and changes were measured. The following results were obtained for molding composition I and comparative composition I:

TABLE 2

Chemicals resistance

| Reagent | Manufacturer | Application | Result I | Result Comp. I |
|---|---|---|---|---|
| Spitacid | Henkel, Dusseldorf | Hand disinfectant | No change | Stress cracks |
| Meliseptol | B. Braun, Melsungen | Spray disinfectant | No change | Stress cracks |
| Lysoformin | Lysoform, Berlin | Wipe disinfectant | No change | Stress cracks |
| Methylated spirit | Mayer-Chemie | Cleaner | No change | Stress cracks |

TABLE 2-continued

Chemicals resistance

The ASA molding composition according to the invention is markedly superior to ABS.
Spitacid ® comprises per 100 g: 46 g of ethanol (96% strength) 27 g of isopropanol (100% strength) 1 g of benzyl alcohol.
Meliseptol ® comprises per 100 g: 50 g of 1-propanol 0.2 g of glyoxal (40% strength)
Lysoformin ® comprises per 100 g: 16.8 g of formaldehyde DAB 8 3.5 g of glutaraldehyde It can be seen from Table 2 above that molding composition I according to the invention has better resistance than comparative molding composition I to disinfectant and chemicals.

To study yellowing performance, molding composition I and comparative composition I were subjected to the xenon arc test 450 in accordance with DIN 53387, method 2. The light source used was the Ultra-Scan from the manufacturer Hunter LAB. Test specimens were injection molded at 250° C. polymer temperature and 60° C. mold temperature in a manner based on that of Ex. 9.

The following results were obtained:

TABLE 3

Yellowness index after irradiation

Yellowness index in accordance with DIN 6167

| Irradiation time h | Comp. I* | I** | I*** |
|---|---|---|---|
| 0 | 8 | 8 | 8 |
| 200 | 12 | 7 | 7 |
| 500 | 16 | 6 | 6 |
| 1000 | 22 | 6 | 6 |
| 1500 | 27 | 8 | 6 |

*The molding composition additionally comprises 4% by weight of TiO₂.
**The molding composition additionally comprises 4% by weight of TiO₂, based on the total weight of components A and B.
***The molding composition additionally comprises 4% by weight of TiO₂, and also 0.5% by weight of a HALS stabilizer (Tinuvin ® 770, marketed by CIBA AG) and 0.5% by weight of a UV absorber (Tinuvin ® P from CIBA AG).

It can be seen from the yellowness indices in Table 3 that the molding compositions according to the invention are significantly more resistant than comparative composition I to yellowing.

As can be seen from the above results of experiments, compared with known wall elements the novel wall elements have far superior chemicals resistance and far superior resistance to yellowing and graying (lightfastness).

We claim:

1. Sheet-like wall elements and fastening parts therefor for the use in washroom sector, in swimming pool or swimming bath installations, steam room installations or sauna installations, comprising a macroscopic filling material produced from a foamed polymer, at least part of the surface of which has been covered with a thermoplastic molding composition differing from ABS and comprising, based on a total of 100% by weight of amounts of components A, B, C and D, a: as component A, from 1 to 99% by weight of a particulate emulsion polymer with a glass transition temperature of below 0° C. and with a median particle size of from 50 to 1000 nm, made from a1: from 1 to 99% by weight of a particulate graft base A1 with a glass transition temperature of below 0° C., composed of the following monomers:

a11: as component A1, from 80 to 99.99% by weight of a $C_1$–$C_8$-alkyl acrylate, and a12: as component A12, from 0.01 to 20% by weight of at least one polyfunctional crosslinking monomer, a2: from 1 to 99% by weight of a graft A2 made from the monomers, based on A2, a21: as component A21, from 40 to 100% by weight of units of a vinylaromatic monomer, and a22: as component A22, up to 60% by weight of units of an ethylenically unsaturated monomer, where the graft A2 is composed of at least one graft shell, b: as component B, from 1 to 99% by weight of at least one amorphous or partly crystalline polymer, c: as component C, from 0 to 50% by weight of polycarbonates, and d: as component D, fro 0 to 50% by weight of fibrous or particulate fillers or mixtures of these.

2. A sheet-like wall element or fastening part therefor as claimed in claim 1, which comprises a sandwich structure in which said macroscopic filling material produced from a foamed polymer is located between two layers of said thermoplastic molding composition.

3. Sheet-like wall elements and fastening parts therefor as claimed in claim 1, in which component A12) is selected from the group consisting of tricyclodecenyl acrylate, diallyl phthalate and dicyclopentadienyl acrylate.

4. Sheet-like wall elements and fastening parts therefor as claimed in claim 1, in which component A21) is styrene or a-methylstyrene.

5. Sheet-like wall elements and fastening parts therefor as claimed in claim 3, in which component A21) is styrene and component A22) is acrylonitrile.

6. Sheet-like wall elements and fastening parts therefor as claimed in claim 1, wherein component B) is a copolymer of a vinylaromatic monomer, a methacrylate or mixtures thereof with acrylonitrile or methacrylonitrile.

* * * * *

UNITED STATES PATENT AND TRADEMARK OFFICE
CERTIFICATE OF CORRECTION

PATENT NO. : 6,197,872 B1  
DATED : March 6, 2001  
INVENTOR(S) : Naarmann et al.

Page 1 of 1

It is certified that error appears in the above-identified patent and that said Letters Patent is hereby corrected as shown below:

Column 19, Claim 1:
Line 1, "A1" should be --A11--.
Line 17, "fro" should be --from--.

Column 20, Claim 4:
Line 11, "a-methylstyrene" should be --α-methylstyrene--.

Signed and Sealed this

Twelfth Day of June, 2001

*Attest:*

Nicholas P. Godici

*Attesting Officer*

NICHOLAS P. GODICI
*Acting Director of the United States Patent and Trademark Office*